3,407,149
PROMOTED CATALYST FOR METHANE
PRODUCTION
William F. Taylor, Scotch Plains, and John H. Sinfelt,
Berkeley Heights, N.J., assignors to Esso Research and
Engineering Company, a corporation of Delaware
No Drawing. Filed Oct. 21, 1963, Ser. No. 317,800
2 Claims. (Cl. 252—466)

ABSTRACT OF THE DISCLOSURE

A catalyst of high activity for reacting paraffin hydrocarbons with steam at 600° to 925° F. is made by coprecipitating hydroxides, carbonates and basic carbonates of nickel, iron, and aluminum in proportions to make the catalyst contain 0.4 to 1.5 gram atoms of nickel per gram atom of aluminum and 0.001 to 0.2 gram atom of iron per gram atom of nickel, the coprecipitated compounds being dried, then calcined at 600° to 925° F., and activated by reducing with hydrogen at 600° to 925° F. The small amount of iron present acts as a good promoter in this catalyst for increasing said activity.

---

This invention relates to an iron promoted nickel-alumina catalyst of high nickel-content and high surface-area and which is highly active in the production of a methane-rich fuel gas by reaction of paraffins having 5 to 8 carbon atoms per molecule with steam at low reaction temperatures in the range of 600° to 925° F.

Nickel catalysts having nickel on a refractory support or carrier, such as magnesia, kaolin or china clay (alumina silicates), or alumina, both with and without alkali metal or alkaline earth metal oxides as promoters, are known to have been used for reacting $C_1$ to $C_4$ paraffins with steam at temperatures above 1000° F. to produce mainly hydrogen and oxides of carbon. Such a high-temperature reaction is endothermic. The catalysts exposed to high-temperatures and used for such high-temperature processes have been of the type which have the porous carrier impregnated by a relatively minor proportion of nickel having a low surface area. The same types of nickel catalysts have been described as suitable for steam reforming of higher hydrocarbons to produce methane with hydrogen and carbon oxides at lower temperatures, up to 1000° F., and no tests were reported to show whether such catalysts were able to exhibit high activity at low reaction temperatures and able to maintain their activity at low temperatures for a sufficiently long period to make their use practical.

In accordance with the discoveries of the present invention, high nickel-content, high surface-area nickel-alumina catalysts with an iron promoter prepared by a coprecipitation technique using a precipitant such as $NH_4HCO_3$ and controlled low temperatures of treatment have been found easier to reduce, more active and with lower deactivation rates in extensive life tests in the reaction of steam with $C_5$ to $C_8$ paraffins to produce mainly methane at reaction temperatures in the range of 600° to 925° F. than have other kinds of nickel catalysts, including commercial types and types described in the literature.

The iron promoted nickel-alumina catalyst is made in accordance with the present invention by coprecipitating the metal cations as the hydroxides and carbonates, or basic carbonates of nickel, alumina and iron from an aqueous solution of nitrates of nickel, alumina and iron using ammonium bicarbonate, hydroxide, or carbonate as a precipitating agent. The nitrate salts of the metals are proportioned to obtain the precipitate of the desired nickel content relative to aluminum and iron contents and the precipitate is free from substances which are not to remain in the finished catalyst when the precipitate is separated from the remaining aqueous solution, dried, and then calcined in air under controlled temperatures in the range of 600° to 925° F. The resulting calcined product is activated finally by treatment at a low temperature in the range of 600° to 925° F. with hydrogen which reduces nickel oxides and iron oxides in the calcined product. The thus obtained catalysts are distinguishable from best known nickel catalysts in their composition, their method of preparation and the characteristics such as high nickel-content, high surface-area, ease of reduction, high activity and good activity maintenance. Both the high activity and the activity maintenance have been found to be dependent on the nickel surface area and total surface area, and these surface areas depend on the proportion of nickel in fine subdivision interspersed with the alumina and promoter as a result of proper preparation.

The iron promoted nickel-alumina catalysts of high activity prepared by the coprecipitation technique, dried, calcined, activated by hydrogen and employed in the catalytic reaction at temperatures below 925° F., are made to contain from 0.4 to 1.5 gram atoms of nickel per gram atom of aluminum and 0.001 to 0.20 gram atom of iron per gram atom of nickel.

In the development of the present invention, evidence has been obtained to the effect that the catalysts of high initial activity in the low temperature exothermic reactions of $C_5$ to $C_8$ paraffins with steam and reduction of CO to form methane are more stable and longer lived, and this is contrary to the usual rule.

It is important to avoid exposure of the catalyst to high temperatures, especially above 925° F. in the presence of an oxidizing gas, e.g. air or steam, which tends to cause more rapid deterioration as indicated by lowered surface area. It is also important to prevent contamination of the catalyst by substances which deactivate the catalyst such as sulfur-containing compounds and various other compounds which would cover the nickel surface. In the preferred procedure for making the Ni-$Al_2O_3$-Fe catalyst by coprecipitation, an aqueous solution is prepared of nickel nitrate and aluminum nitrate in desired proportions using preferably deionized water to avoid undesired contaminating salts. Ammonium bicarbonate is added gradually to the solution of the nitrated salts as a precipitating agent with stirring of the solution while maintaining the solution at a temperature in the range of 32° to 212° F. The basic carbonate precipitate of nickel, aluminum and iron is separted from the excess solution and dried at a suitable temperature, preferably in the range of about 200° to 400° F. After the drying, which is normally done for 18 hours, the dried precipitate is calcined in the presence of oxygen-containing gas or air at a siutable calcination temperature in the range of about 600° to 925° F. for a period of 1 to 10 hours, preferably 4 hours. Catalyst granules of a suitable size can be separated from the calcined material by screening or the catalyst can be formed by various means to any desired shape.

More comprehensively, the preparation of the desired catalyst involves forming a solution of water-soluble compounds of nickel, aluminum and iron in predetermined proportions so that on addition of ammonium precipitant, or equivalent precipitating agent, coprecipitation of hydroxides or carbonates, or a mixture of the two occurs. Ammonium bicarbonate is the preferred precipitating agent, but other agents such as ammonium hydroxide or carbonate or ammonia and carbon dioxide may be employed to obtain the coprecipitation. Reagents such as sodium or potassium hydroxide, carbonate or bicarbonate could be used but would require washing to remove the anion. The anion of the water-soluble solvents of the nickel, aluminum and iron should be a nitrate group or similar group which is decomposed in the subsequent calcination. In the calcination the ammonium salts of such anions from the remaining liquid undergo decomposition and are removed as gases and vapors.

The precipitated compounds of nickel, aluminum and iron are termed basic carbonates in that they are mixtures of hydroxides and carbonates in somewhat variable compositions with respect to the amount of $CO_3$, OH and $H_2O$ combined with the metal ions.

During the calcination, the nickel, aluminum and iron are in an oxidized form; and for final activation, the calcined material is subjected to treatment with hydrogen at a temperature in the range of about 600° to 925° F. and a hydrogen pressure of 1 atm. or greater to reduce the nickel and iron. The reduction treatment can be carried out after the reactor is loaded with the calcined material.

In the low-temperature reaction of steam with vapors of low-boiling normally liquid naphtha hydrocarbons using the catalyst to produce gas containing mainly methane, the hydrocarbon vapor and steam are preheated to a temperature above 600° F. and to such a temperature as to maintain a suitable reaction temperature, preferably in the range of about 600° to 925° F. in the reaction zone where the hydrocarbon vapor and steam are passed into contact with the catalyst. Generally, the proportion of steam is about 1.5 to 5 parts by weight for one part by weight of hydrocarbon, preferably 1.8 to 2.5 parts water per part of hydrocarbon. The pressure in the reaction zone may be in the range of 1 to 70 atmospheres, preferably greater than 10 atmospheres, since at higher pressures carbon formation is reduced to a point where little carbon is formed over long periods of time.

By having the temperature of reaction between the steam and hydrocarbon vapor sufficiently low and the pressure sufficiently high, the content of methane in the gas product is increased. The desired fuel gas product should generally contain more than 50% by volume of methane on a water-free basis and the concentration of methane can be increased by removal of carbon dioxide and water. Studies have shown that it is desirable to keep the activated catalyst at as low a reaction temperature as possible during the reaction of hydrocarbons with steam, because deactivation or lowering of the surface area is increased as the temperature is elevated. The deactivation may result from oxidation of the nickel by steam and sintering as the temperature is raised substantially above 700° F.

The methane-rich fuel gas product obtained through the reaction of the low-boiling hydrocarbons with steam may be used for diluting other fuel gases such as natural gas or gas containing carbon monoxide and hydrogen. It may be used as fuel gas by itself because it has sufficiently high calorific content. In the low temperature catalytic reaction of the hydrocarbons with steam to form methane, the net heat of reaction is generally exothermic so there is no need to supply heat to the reactor other than sensible heat of the hydrocarbon and steam which may be preheated to a temperature below the reaction temperature in the current zone.

Details on the preferred methods for preparing the catalyst, testing the catalyst, and using the catalyst are given in the following examples.

Example 1.—Preparation of Ni-$Al_2O_3$-Fe catalyst

An iron promoted catalyst was prepared by adding 750 g. $Ni(NO_3)_2 \cdot 6H_2O$, 648 g. $Al(NO_3)_3 \cdot 9H_2O$ and 90.5 g. of $Fe(NO_3)_3 \cdot 9H_2O$ to 3.0 liters of deionized water. The cations were coprecipitated by adding 1040 g. of $NH_4HCO_3$ to the solution while holding the slurry temperature between about 50° and 32° F. After the $NH_4HCO_3$ is added, the slurry is stirred an additional 10 minutes. The precipitate is filtered and then dried overnight at 350° F. Following this the catalyst is calcined in air for 4 hours at 750° F. The catalyst analyzed 47.7 wt. percent nickel and 4.6 wt. percent iron and had a total surface area as measured by the $N_2$ B.E.T. chemisorption technique of 169 m.²/g. catalyst.

The catalyst was charged to a reactor and reduced with $H_2$ for 10 hours at 700° F. and 25 p.s.i.g. The activity of the catalyst was measured by passing 5.6 lbs. of 95% n-hexane per hour per lb. of catalyst at 700° F. (temperature of a molten lead bath into which the steel reactor and pre-heater were immersed) and 500 p.s.i.g. with 2.0 lbs. of $H_2O$ per lb. of hydrocarbon. The following data were obtained:

| | | |
|---|---|---|
| Hours on feed | 32–40 | 56–64 |
| Percent feed conversion | 97.9 | 83.8 |
| Gas composition, mole percent (dry basis with $C_2$+ material removed): | | |
| $CH_4$ | 73.54 | 70.1 |
| $H_2$ | 5.74 | 8.47 |
| CO | 0.11 | 0.65 |
| $CO_2$ | 20.62 | 20.76 |
| Heating value, B.t.u./s.c.f. (dry, no $C_2$+ and with all but 2% $CO_2$ removed) | 940 | 912 |

A series of nickel-alumina catalysts having a normal composition of 45 to 50 wt. percent nickel was prepared by the coprecipitation technique with the method of drying and calcination described. Some of the catalysts were prepared with no addition of promoter and others were prepared with the addition of promoting materials added as compounds to the coprecipitated nickel and alumina basic carbonates. The nickel surface area for each of the catalysts as measured by hydrogen chemisorption after reduction in $H_2$ at 700° F. ranged from 9 to 30 m.²/g.

The activity of each of each catalyst was measured in a standard test by the reaction of hexane with steam using 1 lb. of hexane per 2 lbs. $H_2O$ at a rate of 5.6 lbs. of hexane per pound of catalyst per hour in a reactor in which the reaction temperature was maintained at 700° F. and under a pressure of 500 p.s.i.g. The catalyst were pre-reduced for 10 hours with $H_2$ at 700° F. to insure reduction of the nickel. The activity was determined as standard cubic feet per hour (s.c.f./hr.) of product gas at the 50th hour and comparison of the activity tests showed that the iron promoted nickel-alumina catalyst with an activity of 9.8 s.c.f./hr. at hour 50 is better than the potassium promoted nickel-alumina catalyst which had an activity of 9.4 s.c.f./hr. at hour 50. The best unpromoted catalyst preparations produced 8.7 s.c.f./hr. while an unpromoted catalyst prepared at the identical coprecipitation and drying temperature as the iron promoted catalyst produced 5.5 s.c.f./hr. of gas at hour 50, which indicated a 78% increase of activity relative to the unpromoted nickel-alumina catalyst made by the same technique but with the promoter omitted.

For carrying out comparative tests isothermal reactor units were used so that temperatures could be measured in the lead bath surrounding the reactor containing the catalyst charge and also measured in the catalyst bed, as at the entrance to the bed, the center of the bed, and the bed outlet. With the use of highly active catalysts the temperature gradient tends to be pronounced. In some instances the temperature at the inlet to the catalyst bed and at the center of the bed is below that of the lead bath. In some instances the outlet temperature may be as high as 100° F. or more above that of the lead bath on account of the exothermic heat released.

What is claimed is:
1. A catalyst of high activity when its nickel and iron components are reduced for reacting normally liquid hydrocarbons containing principally $C_5$ to $C_8$ paraffins in vapor phase with steam at a temperature of 600° to 925° F. to produce a gas rich in methane, said catalyst containing 0.4 to 1.5 gram atoms of nickel per gram atom of aluminum which is present as alumina and containing 0.001 to 0.2 gram atom of iron per gram atom of nickel from coprecipitated compounds of nickel, iron and aluminum of the group consisting of hydroxides, carbonates and basic carbonates, said compounds being dried at 200° to 400° F. and calcined at 600° to 925° F., said catalyst having a nickel surface area of 9 to 30 m.$^2$/g. of catalyst after reduction in $H_2$ at 700° F.

2. The catalyst as defined in claim 1 in which the nickel and iron components are reduced by hydrogen at a temperature in the range of 600° to 925° F.

References Cited

UNITED STATES PATENTS

| | | | |
|---|---|---|---|
| 1,642,624 | 9/1937 | Northrup | 252—466 X |
| 2,151,329 | 3/1939 | Page et al. | 252—466 |
| 2,296,405 | 9/1942 | Scheuermann et al. | 252—466 X |
| 2,374,175 | 4/1945 | Burk et al. | 252—466 X |
| 2,449,295 | 9/1948 | Gutzeit | 252—466 |

FOREIGN PATENTS

| | | |
|---|---|---|
| 820,257 | 9/1959 | Great Britain. |

DANIEL E. WYMAN, *Primary Examiner.*

C. F. DEES, *Assistant Examiner.*